United States Patent Office 3,200,138
Patented Aug. 10, 1965

3,200,138
MESYLOXYACETIC ACID AND ACID CHLORIDE
Heinz M. Wuest, Upper Montclair, N.J., assignor to Warner-Lambert Pharmaceutical Company, Morris Plains, N.J., a corporation of Delaware
No Drawing. Filed Apr. 9, 1962, Ser. No. 185,826
2 Claims. (Cl. 260—456)

This invention relates to novel compounds of the formula

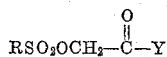

wherein R is a lower alkyl radical such as, for example, a methyl, ethyl, or propyl group, and Y is —OH or a halogen such as chlorine and bromine.

An object of this invention is the production of compounds having the structure described as above. Another object of this invention is the production of intermediates useful in the production of said compounds. The compounds of this invention are useful alone and as intermediates in synthesizing novel compounds such as 2-mesyloxymethyl-4-phenyl-6-chloroquinazoline-3-oxide as described in my co-pending application, Serial No. 204,301, filed April 9, 1962, now U.S. Patent No. 3,138,586.

The synthesis of the novel compounds of this invention employs as the starting materials compounds of the formula $$RSO_2OCH_2CN$$

where R has the same significance as above. These nitriles are novel compounds and their preparation is also a feature of this invention.

Mesyloxyacetic acid, for example, is conveniently obtained by hydrolysis of mesyloxyacetonitrile with mineral acids or alkali metal hydroxides. The mesyloxyacetonitrile may be prepared by the following sequence of steps:

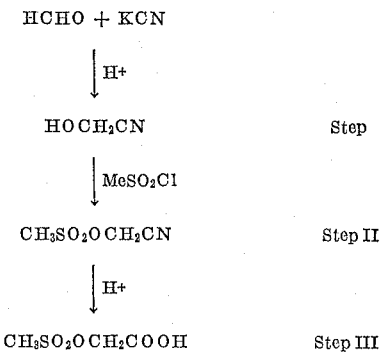

In Step I, formaldehyde is reacted with an acidified solution of potassium cyanide to form glycolonitrile. The glycolonitrile is reacted in Step II with methanesulfonyl chloride in the presence of an alkali metal hydroxide to form mesyloxyacetonitrile. Step III comprises the hydrolysis of the mesyloxyacetonitrile with a mineral acid such as sulfuric acid whereby mesyloxyacetic acid is formed. The hydrolysis can also be effected by an alkali metal hydroxide whereby the salt of mesyloxyacetic acid is formed, and on neutralizing the latter with a mineral acid, the free mesyloxyacetic acid is obtained.

In order further to illustrate this invention but without being limited thereto, the following examples are given:

*Example 1*

To 50 g. of potassium cyanide in 100 ml. water is added with stirring 23.1 g. of formaldehyde and the resulting solution is aged for about 15 minutes at —5° C. to 0° C. The solution is then acidified with sulfuric acid to a pH of 4.5 and is filtered and the residue then washed four times with 20 ml. portions of ether. The aqueous filtrate is saturated with about 75 g. of sodium chloride and is then continuously extracted with ether for at least four hours. The ethereal extracts and the etheral washings are then combined and dried over anhydrous sodium sulfate, the solvent then being removed under vacuo. The residue contains the desired reaction product, glycolonitrile. After distillation by slowly sucking into a distilling flask immersed in an oil-bath at about 150° C., 40 g. of potassium hydroxide in 80 ml. of water are added to the glycolonitrile distillate with stirring. The solution obtained is cooled to 0° C. and 44.1 ml. of methanesulfonyl chloride is added. The resulting suspension is aged for four hours at 15° C., and a sufficient amount of water is added to this suspension to dissolve the solids. The solution is then extracted five times with benzene. The combined benzene extracts are dried over sodium sulfate, and the benzene removed by vacuo. A white solid consisting of mesyloxyacetonitrile is obtained which has an M.P. of 25° C. Further distillation of the crude product gives a purified mesyloxyacetonitrile which melts at 31°–32° C.

*Example 2*

To a suspension of 34.2 g. of mesyloxyacetonitrile in 34.2 ml. water is added, with stirring, 70 ml. of concentrated sulfuric acid and the reaction mixture is maintained at 120° C. for 30 minutes. 25 ml. water is then added, the mixture filtered, and the residue dissolved in ether. The ethereal solution is dried and the ether removed by vacuo to obtain a white residue of mesyloxyacetic acid which melts at 113°–114° C.

Further extraction of the aqueous filtrate with ether yields a second crop of mesyloxyacetic acid and, after drying and removal of the ether solvent employed for the extraction, the residue is recrystallized from ethanol. The recrystallized product melts at 113°–114° C.

*Example 3*

A mixture of 68.4 g. of mesyloxyacetic acid and 120 g. of thionyl chloride is refluxed at 70° C.–80° C. for three hours. At the conclusion of this period, the excess thionyl chloride is removed in vacuo, the reaction product, mesyloxyacetyl chloride remaining in the residue.

It is understood that the above detailed examples are given merely by way of illustration and that many variations may be made therein without departing from the spirit of this invention.

Having described my invention, what I desire to secure by Letters Patent is:

1. Mesyloxyacetic acid.
2. Mesyloxyacetyl chloride.

References Cited by the Examiner

Freudenberg et al., Ann. der Chem., vol. 518, pp. 86–96 (1935).

Lichtenberger et al., Bull Soc. Chim. France, pp. 995–1001 (1948).

Lucas, "Organic Chemistry," 2nd ed., pp. 169, 458 (1953), publ. American Book Co., New York, N.Y.

Pattison et al., Can. J. Chem., vol. 34, 757–768 (1956).

Vieillefosse, Bull. Soc. Chim. France, vol. of 1947, pp. 351–356.

CHARLES B. PARKER, *Primary Examiner.*